US004001767B2

United States Statutory Invention Registration [19]

[11] Reg. Number: H1767

Davis et al. [45] Published: Jan. 5, 1999

[54] DEVICE TO IMPROVE THE MOBILITY OF TOWED HOWITZERS

[75] Inventors: Bradford S. Davis, Jarrettsville; John L. Thompson, Havre de Grace, both of Md.

[73] Assignee: The United States of America as represented by the Secretary of the Army, Washington, D.C.

[21] Appl. No.: 668,621

[22] Filed: Jun. 11, 1996

[51] Int. Cl.[6] ..... F41A 23/00

[52] U.S. Cl. ..... 89/40.01; 89/40.08; 89/40.09; 89/40.15

[58] Field of Search ..... 89/40.01, 40.02, 89/40.08, 40.09, 40.13, 40.15, 40.07

[56] References Cited

U.S. PATENT DOCUMENTS

| | | | |
|---|---|---|---|
| 1,899,145 | 2/1933 | Goebert et al. | 89/40.15 |
| 2,412,971 | 12/1946 | Davidson | 89/40.15 |
| 3,315,566 | 4/1967 | Klapdohr et al. | 89/40.01 |

FOREIGN PATENT DOCUMENTS

| | | |
|---|---|---|
| 0468200 | 6/1937 | United Kingdom . |
| 0493271 | 10/1938 | United Kingdom . |

OTHER PUBLICATIONS

Davis & Thompson, A Tandem Wheel Attachment to Improve M198 Howitzer Mobility, Aug. 1995.

*Primary Examiner*—J. Woodrow Eldred

*Attorney, Agent, or Firm*—Freda L. Krosnick; Paul S. Clohan

[57] ABSTRACT

A receiver, modeled after the spade-like lug attachment of a M198 howitzer spade, inserts into the recess on the bottom rear end of the left trail of the howitzer. On this end surface is a square hole for inserting the spade key which secures the receiver to the trail. Attached to the receiver is an interface plate that acts as the union between the receiver and a pair of caster wheels. The interface plate has a keyway, in which the receiver bottom inserts, and also has two built-in handles. Two bolts affix the receiver to the interface plate and thread directly into the receiver body. The interface plate is bolted to dual-pneumatic caster wheels. This combination allows the left trail of the howitzer to be mobile and facilitates the increased mobility of the M198 howitzer.

8 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DEVICE TO IMPROVE THE MOBILITY OF TOWED HOWITZERS

GOVERNMENTAL INTEREST

The invention described herein may be manufactured, used and licensed by or for the United States Government without payment to me of any royalty thereon.

TECHNICAL FIELD

The present invention relates to towed vehicles in general and more particularly to an attachment to towed howitzers that will greatly improve their mobility during transportation and operation.

BACKGROUND ART

The United States Army's M198 towed 155-mm Field Artillery Howitzer is a medium weight weapon weighing approximately 16,000 pounds. Operated by an 11 man crew, this weapon is designed to provide general support and direct support artillery fire for infantry and air assault divisions and in the corps general support battalions. It is also used to increase light infantry division capabilities as required by specific missions. The M198 is used by both the U.S. Army and the U.S. Marine corps units, active and reserve.

Currently there are four methods of transporting the M198 howitzer; air, ground, water, and rail. The principal method of transport is by ground. Because of its high tongue weight (4,200 lbs. In the stowed configuration) the M198 howitzer must be towed by a relatively large vehicle, such as a 2½ ton or a 5-ton cargo truck. The 5 ton cargo truck is assigned to the artillery unit and transports the unit personnel, their ammunition, equipment, and the M198 Howitzer in a stowed or towed A-frame position configuration. The 5-ton cargo truck is equipped with a rear pintle hook that attaches to the M198 howitzer's lunette (a ring in the trail plate of the towed howitzer, that is used to attach the howitzer to the pintle of the 5-ton cargo truck). Towing in the towed A-Frame configuration is recommended in tactical situations because towing in the stowed configuration usually requires removal of the muzzle brake.

During combat operations, it may be necessary for the commander to quickly move his fire support assets forward to engage targets that are beyond the weapons range capabilities and then quickly move them back to support the close battle. To conduct these missions, the commander would use the heavy lift assets within the Corps to airlift the howitzers on an artillery raid.

The primary method of air transport of the howitzer is the CH-47D, or larger, heavy lift helicopter. The howitzer is externally rigged for air transport with lifting hardware attached to the four lifing eyes. The howitzer is in the A-frame configuration during air transport. The crew, ammunition, and equipment are secured within the helicopter. Once the aircraft reaches its destination, it drops off the howitzer, crew, ammo, and equipment and then departs. There currently is no method of moving the howitzer once it has been positioned by the helicopter, since the 5-ton truck is not air-liftable.

To meet the increased requirement for responsiveness and survivability demanded by the broad range of future combat missions, towed howitzers must have the capability to be rapidly and accurately emplaced, conduct fire missions, and move to a new location.

STATEMENT OF THE INVENTION

It is therefore an object of the present invention to improve the M198 howitzer's handling and stowage during transportability and mobility operations.

Another object of the invention is to facilitate the loading and unloading of a stowed M198 howitzer into a cargo carrier aircraft, ship, or landing craft, and to move the M198 howitzer around a motor pool/airstrip/tactical environment.

A further object of the invention is to emplace the M198 howitzer during air assault operations.

Another object of the invention is to obtain M198 howitzer weight and center of balance measurements before air movements.

These and other objects are achieved by providing a receiver which is modeled after the spade-like lug attachment of the M198 howitzer's spade, which inserts into the recess of the bottom rear end of the howitzer's left trail. On these end surfaces is a square hole for inserting the spade key that secures the receiver to the trail. Attached to the receiver is an interface plate that acts as the union between the receiver and the caster wheels. The interface plate has a keyway, in which the receiver bottom inserts, and also has two built-in handles. Two bolts affix the receiver to the interface plate at the tabs and two bolts thread directly into the receiver body. The interface plate is bolted to dual-pneumatic caster wheels. This combination allows the left trail to be mobile and facilitates in the increased mobility of the M198 howitzer.

DETAILED DESCRIPTION OF THE PREFERRED EMBODIMENT

Figure 1:
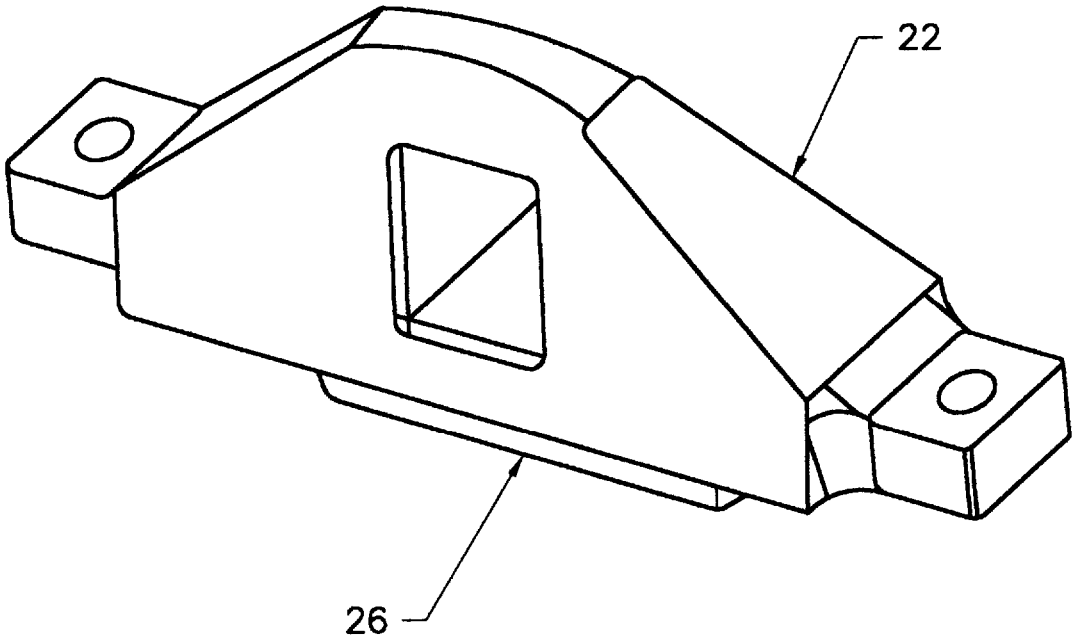
FIG. 1 is an isometric view of the device's receiver.
Figure 3:
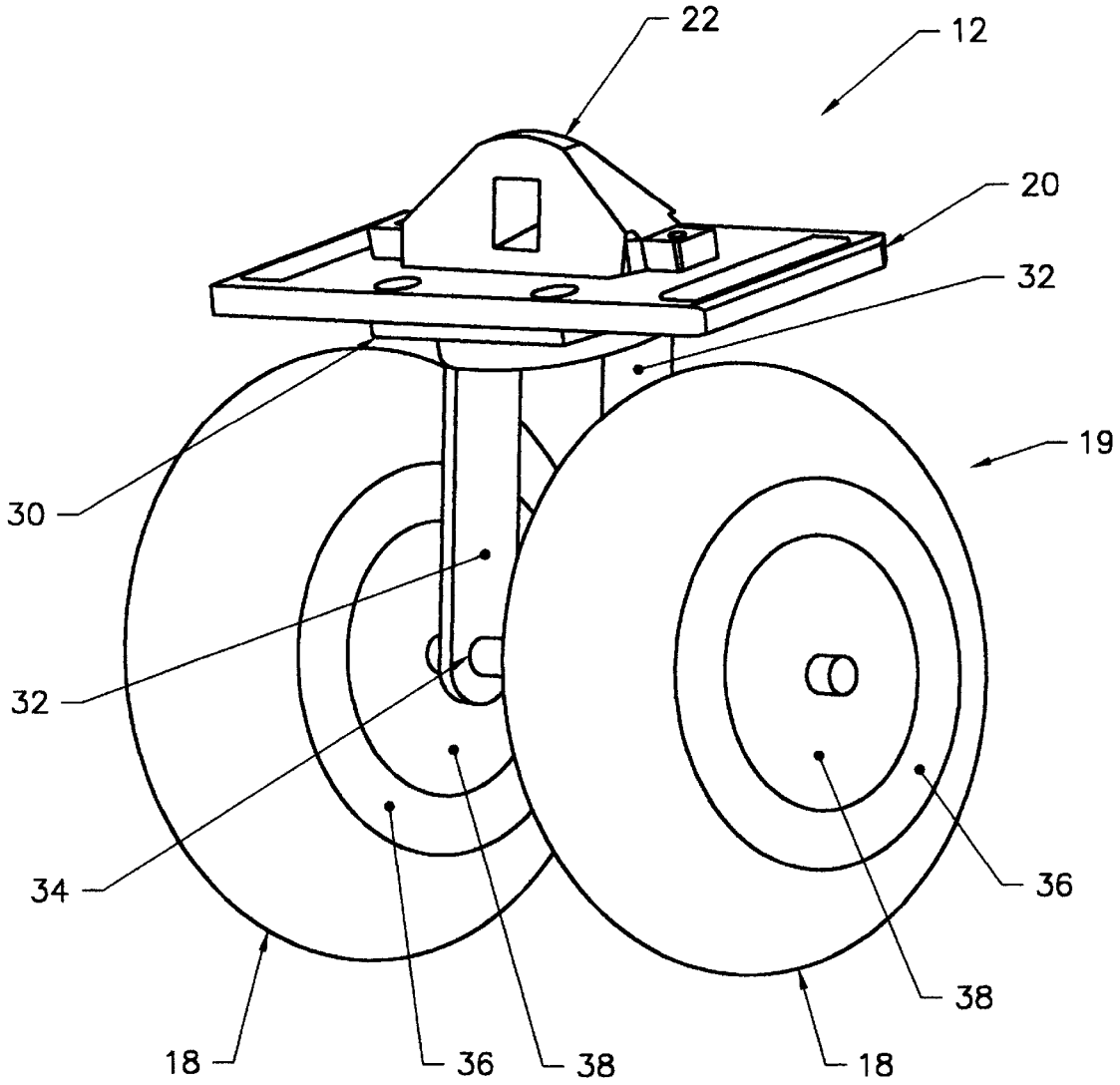
FIG. 3 depicts the device's tandem wheel assembly.
Figure 4:
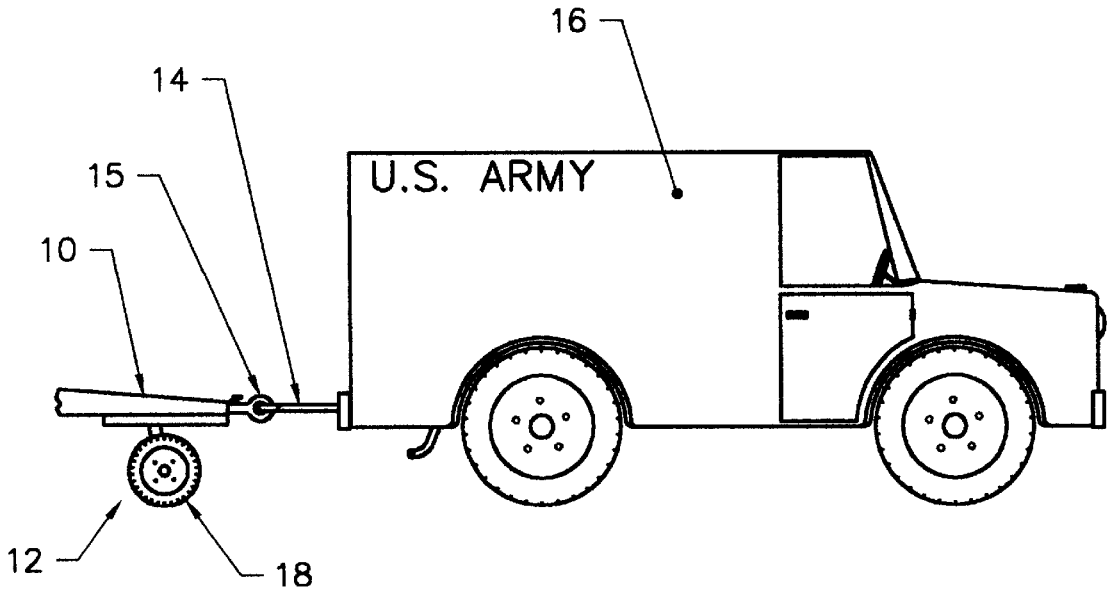
FIG. 4 depicts the left trail of a howitzer having the present invention attached and being moved by a vehicle.

Referring now in detail to the drawings wherein like parts are designated by like reference numerals throughout there is illustrated in FIG. 4 the left trail 10 of an M198 howitzer with device 12 attached near the lunette of the howitzer to improve its mobility. The howitzer is being moved by vehicle 16 via tow bar 14 attached to connector box 15 which is attached to the lunette of left trail 10. Steel connector box 15 has a built-in pintle hook and allows th M198 lunette to easily hook-up to the existing inventoried tow-bar 14. The M198 lunette is inserted into the steel connector box 15 and is fastened by a steel pin inserted through an aluminum cylinder and secured with a cotter pin for safety. The pintle hook of connector box 15 attaches to the eyelet of tow-bar 14. The other ends of tow-bar 14 attach to vehicle 16 shackle brackets. As shown in FIG. 3, device 12 has a pair of wheels 18 attached to an interface plate 20 which in tum is attached to a receiver 22. Receiver 22, shown in detail in FIG. 1, is modeled after a spade-like lug attachment. For durability, receiver 22 should be made from steel, and is designed to insert into the recess on the bottom rear end of left trail 10. On left trail 10 of the M198 howitzer, is a square hole for inserting the spade key, which will be used to secure receiver 22 to left trail 10. This type of attachment allows for easy attachment/disconnect to left trail 10 of the howitzer. Since the right trail of the howitzer is secured to left trail 10 by the trail lock and the trail retaining pin, all weight rest on left trail 10. In addition, when the howitzer is in the stowed configuration, its cannon is bracketed to left trail 10. In this configuration, all of the cannon's weight is placed on left trail 10.

Figure 2:
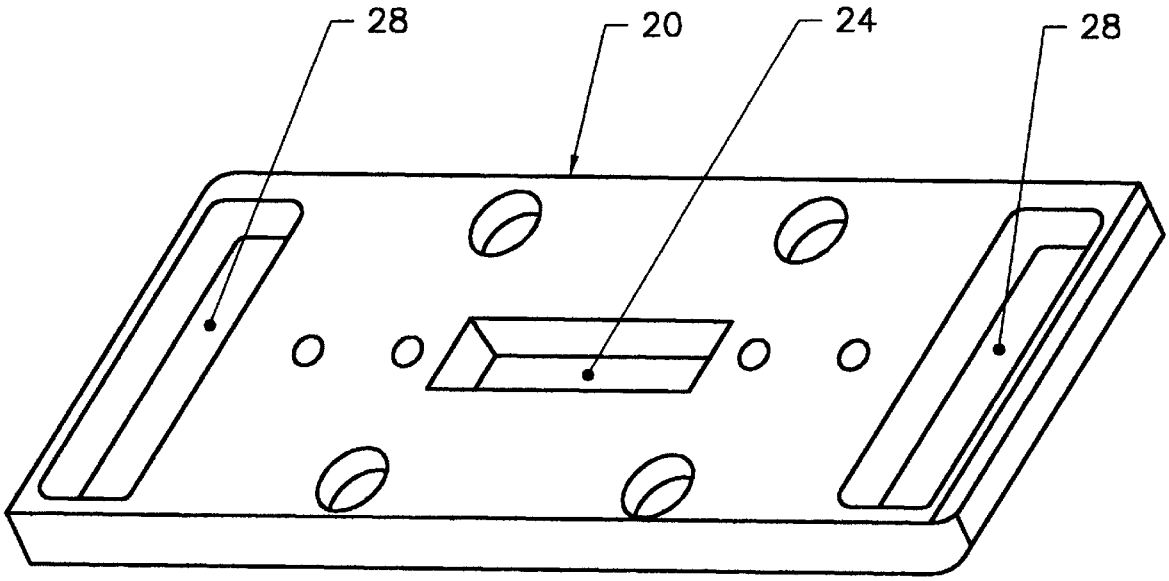
FIG. 2 is an isometric view of the device's interface plate.

Interface plate 20, shown in detail in FIG. 2, acts as the union between receiver 22 and wheels 18. Interface plate 20 can be fabricated from heat treated aluminum to keep it strong, yet relatively lightweight. Interface plate 20 has a keyway 24 designed to mate with a like shaped key 26 on receiver 22. Interface plate 20 is also provided with two integral handles 28. Interface plate 20 can be afixed to receiver 22 by two bolts which thread directly into receiver 22 body, or by any desired permanent method.

Interface plate 20 bolts, or is attached by more permanent means, to dual-pneumatic caster wheel assembly 19. An acceptable wheel assembly 19 is wheel assembly model no. 2-95-SF-21909-BBL, manufactured by Albion Industries Inc. This model wheel assembly is comprised of a top plate 30, a swivel caster thrust bearing with hardened ball bearing race, two steel forks 32 bridged by a axle 34, and two pneumatic tires 18 mounted on wide base rims 36. Rims 36 are bolted to hubs 38 for extra strength and are fully demountable. Caster wheel assembly 19 is designed for heavy duty material handling applications.

The present invention, supporting the trails of the howitzer, in conjunction with tow bar 14 allows a much smaller vehicle 16, such as a pickup truck or a HMMWV, to move the howitzer around a motor pool or airfield at relatively low speeds. In a tactical scenario where only a small area is available for placing a battery of M198 howitzers, the howitzers can be pushed by soldiers if the present invention is utilized. In addition, a motorized version of the present invention would allow the soldiers to "drive" the howitzer to a tree line.

The present invention also facilitates weighing and obtaining the center of balance of an M198 howitzer for air lift missions. Each cargo's actual load center of balance (CB) and weight must be identified to keep the total cargo weight within the aircraft's center of gravity (CG) limits and allowable cabin load (ACL). The M198 howitzer's CB and weight must be taken before each flight due to variations in the equipment that is taken based on the mission requested. Current procedures for measuring tongue weight, overall weight, and CB are cumbersome and timely. Ajack stand is needed to raise the lunette off the pintle and support the weight while the tongue weight is measured. The lunette is then placed back onto the pintle and the jack is removed. The M198 howitzer is then moved forward until it is fully centered on the scale. The jack is then repositioned under the lunette and taken off the pintle. The total weight is then measured. With the present invention attached, the trails are already supported allowing the mover to quickly pull the M198 howitzer into the desired positions with tow bar 14, detach bar 14 from left trail 10, and clear the scale without using the jack. With a motorized version of the invention, the M198 howitzer could be easily moved into position without any vehicle 16 support. This saves time, manpower, and is a much safer operation.

The present invention will also aid in the emplacing the M198 howitzer. With the invention attached to left trail 10, the right trail can be easily pushed by one person until the stops engage and it is fully spread. The right trail is suspended in the air so that the howitzer's spade can be easily attached. With the right trail held in place, left trail 10 can then be moved until is also is fully spread and the stops engage. Either the mover, a jack, or a few soldiers can support left trail 10 so device 12 can be removed and the howitzer's second spade attached. The trails with spades can then be emplaced. Significantly less effort is involved with emplacing/displacing in this manner. Safety would improve as crewman would be less suspectable to back injury or fall while lifting and pushing/pulling.

Having thus shown and described what is at present considered to be the preferred embodiment of the invention, it should be noted that the same has been made by way of illustration and not limitation. Accordingly, all modifications, alterations and changes coming within the spirit and scope of the invention are herein meant to be included.

What is claimed is:

1. A detachable device to improve the mobility of towed howitzers comprising:

receiver means for removable attachment to a trail of said howitzer;

at least one castered wheel;

interface means afixed between said receiver means and said at least one castered wheel means for attachment of said receiver means to said castered wheel means.

2. The device of claim 1 having a pair of castered wheels.

3. The device of claim 2 wherein said pair of castered wheels are connected via two steel forks bridged by a axle having two pneumatic tires mounted on wide base rims.

4. The device of claim 3 wherein said interface means also includes a pair of integral handles.

5. The device of claim 4 wherein said interface means is afixed to said receiver means via bolts.

6. The device of claim 5 wherein said receiver means comprises a spade-like lug attachment.

7. The device of claim 6 wherein said receiver means also incorporates a square slot for attachment of said receiver to a trail of said howitzer via a key.

8. The device of claim 7 wherein said interface means has a slot to mate with a key located on said receiver means.

* * * * *